(12) United States Patent
Ikeyama

(10) Patent No.: US 12,334,855 B2
(45) Date of Patent: Jun. 17, 2025

(54) VEHICLE POWER SOURCE DEVICE

(71) Applicant: TOYOTA JIDOSHA KABUSHIKI KAISHA, Toyota (JP)

(72) Inventor: Toshio Ikeyama, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/388,281

(22) Filed: Nov. 9, 2023

(65) Prior Publication Data
US 2024/0250631 A1 Jul. 25, 2024

(30) Foreign Application Priority Data

Jan. 20, 2023 (JP) .................................. 2023-007036

(51) Int. Cl.
| | |
|---|---|
| *H02P 29/032* | (2016.01) |
| *B60L 50/60* | (2019.01) |
| *B60L 53/00* | (2019.01) |
| *H02J 7/00* | (2006.01) |
| *H02P 23/14* | (2006.01) |
| *H02P 27/06* | (2006.01) |
| *H02P 29/68* | (2016.01) |

(52) U.S. Cl.
CPC ............ *H02P 29/032* (2016.02); *B60L 50/60* (2019.02); *B60L 53/00* (2019.02); *H02J 7/0063* (2013.01); *H02P 23/14* (2013.01); *H02P 27/06* (2013.01); *H02P 29/68* (2016.02); *H02J 2207/20* (2020.01)

(58) Field of Classification Search
None
See application file for complete search history.

(56) References Cited

U.S. PATENT DOCUMENTS

| | | | | |
|---|---|---|---|---|
| 2019/0106002 | A1* | 4/2019 | Götz | B60L 50/60 |
| 2021/0194404 | A1* | 6/2021 | Itou | B60L 50/75 |
| 2022/0402390 | A1* | 12/2022 | Smolenaers | H02J 3/322 |
| 2024/0006908 | A1* | 1/2024 | Jimenez Pino | B60L 53/22 |

FOREIGN PATENT DOCUMENTS

| | | |
|---|---|---|
| JP | 2002-027779 A | 1/2002 |
| JP | 2018-093608 A | 6/2018 |

* cited by examiner

*Primary Examiner* — Jared Fureman
*Assistant Examiner* — Aqeel H Bukhari
(74) *Attorney, Agent, or Firm* — Oliff PLC

(57) ABSTRACT

When an abnormality of one of current sensors corresponding to a plurality of phases is detected during charging, a control device of a vehicle power source device configured to execute a ripple restraining control to continue the charging while controlling switching elements in remaining normal phases of the plurality of phases such that a ripple current to be generated by operation of the switching elements in the normal phases does not exceed a ripple current threshold. The ripple current threshold corresponds to an allowable value of the ripple current to be generated by operation of the switching elements in the plurality of phases when there is no abnormality in any of the current sensors corresponding to the plurality of phases.

5 Claims, 4 Drawing Sheets

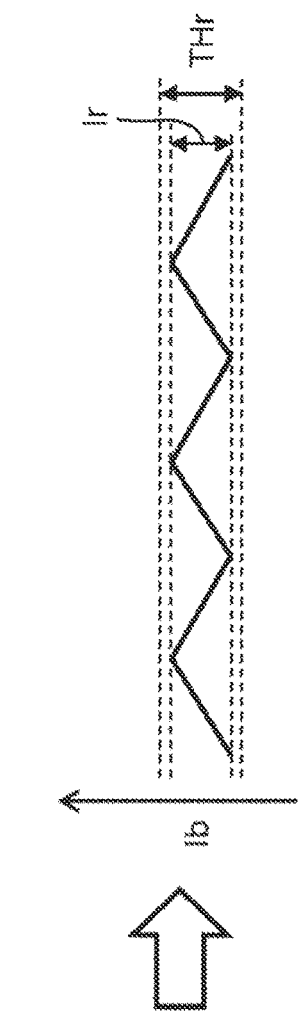
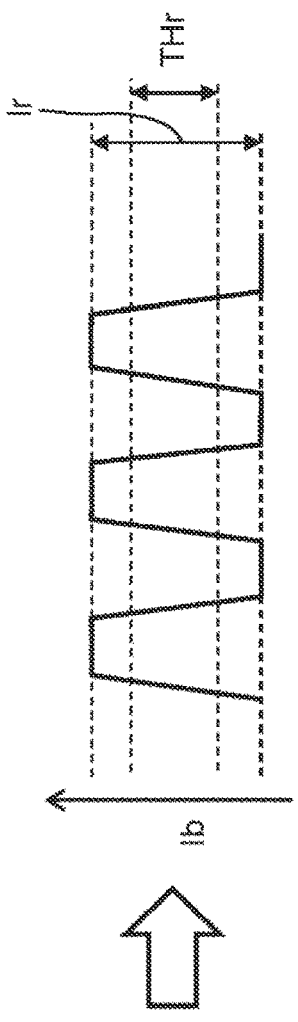
FIG. 2A
FIG. 2B
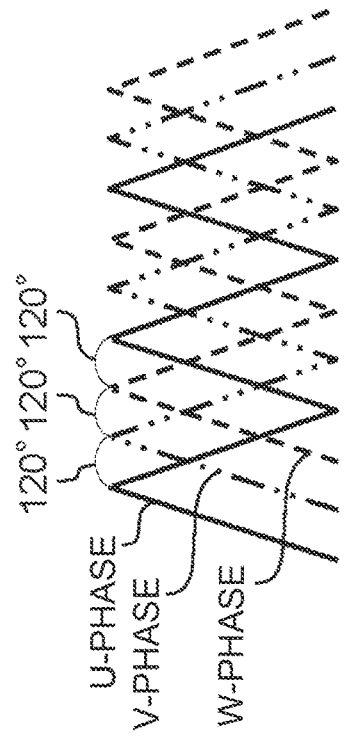
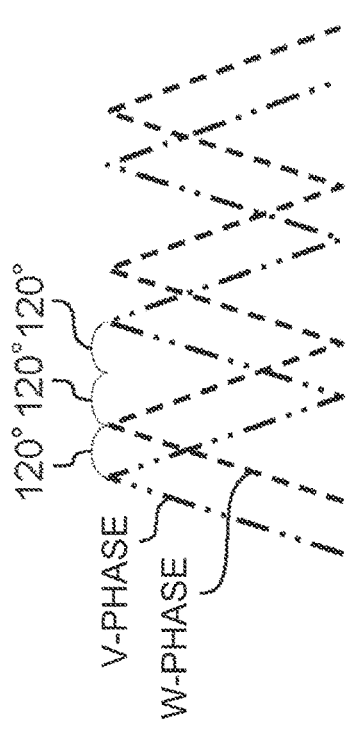

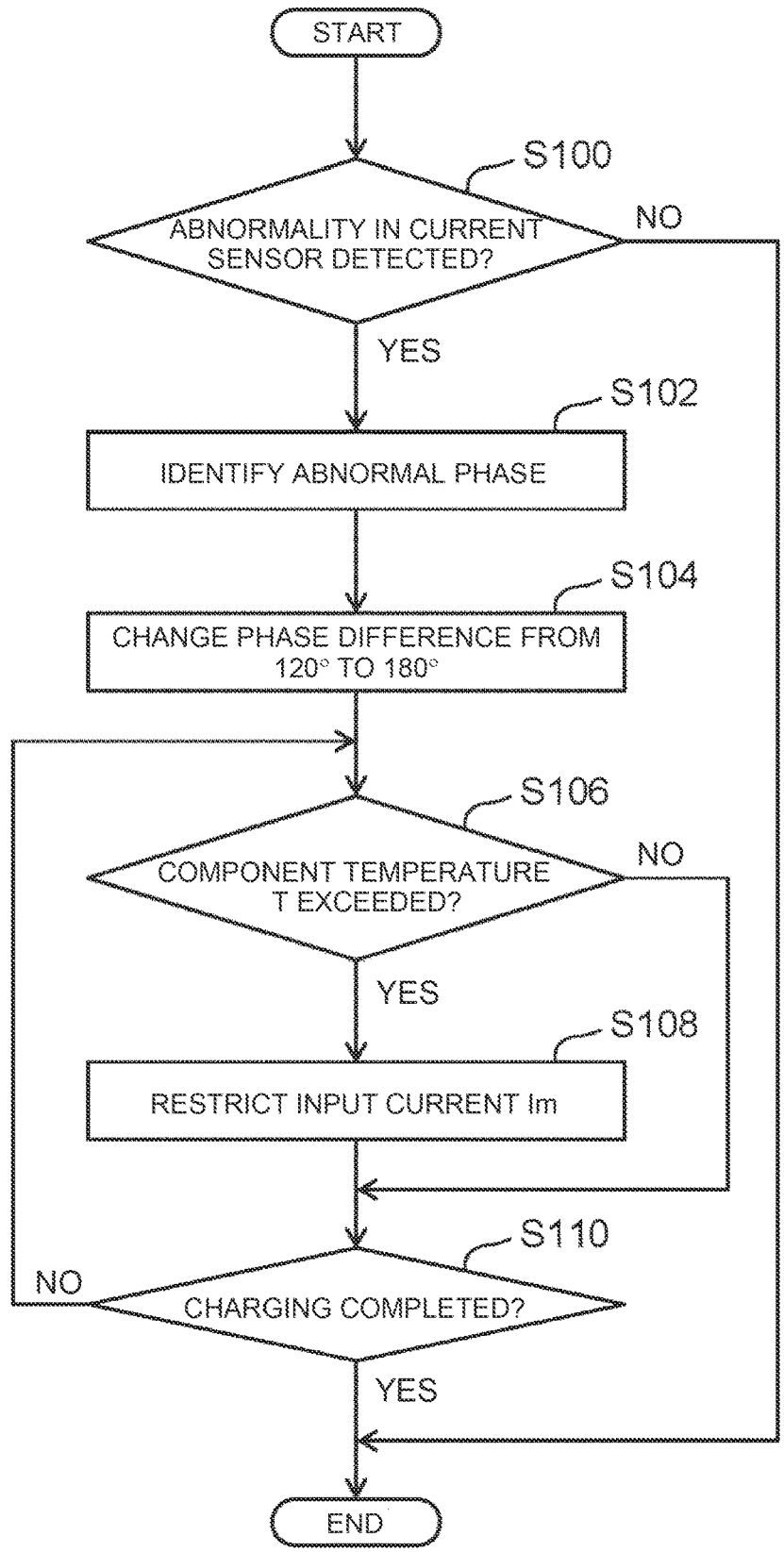

VEHICLE POWER SOURCE DEVICE

CROSS-REFERENCE TO RELATED APPLICATION

This application claims priority to Japanese Patent Application No. 2023-007036 filed on Jan. 20, 2023, incorporated herein by reference in its entirety.

BACKGROUND

1. Technical Field

The present disclosure relates to a vehicle power source device that is applied to a vehicle capable of being externally charged.

2. Description of Related Art

Japanese Unexamined Patent Application Publication No. 2018-093608 discloses a charging system for an electrified vehicle. The charging system includes an in-vehicle electric power conversion device that converts an input voltage supplied from an external electric power conversion device into a charging voltage for an in-vehicle electricity storage device. For restraining the current ripple that is generated in the in-vehicle electric power conversion device, the input voltage to be supplied to the in-vehicle electric power conversion device is decided based on the number of interleaving phases that operate and the voltage between positive and negative terminals of the in-vehicle electricity storage device.

SUMMARY

As a technique for externally charging a battery that is equipped in a vehicle, there is a neutral point charging scheme in which an external power source is connected to a neutral point of an electric motor for vehicle traveling. In a vehicle power source device that employs the scheme, in the case where an abnormality is detected in one of current sensors included for respective phases of the electric motor, it is possible that the external charging is continued by controlling a switching element of the electric power conversion device that corresponds to remaining normal phases. For suitably continuing the external charging, it is desired that the external charging is not stopped due to an excessive increase in the ripple current.

The present disclosure provides a vehicle power source device that makes it possible to suitably continue the external charging while restraining the ripple current when an abnormality is detected in one of current sensors corresponding to a plurality of phases.

A vehicle power source device according to the present disclosure is applied to a vehicle including an electric motor for traveling, the electric motor including coils in a plurality of phases. The vehicle power source device includes a battery, an electric power conversion device, and a control device. The battery configured to supply electric power to the electric motor. The electric power conversion device is connected in parallel with the battery and includes switching elements and current sensors for respective phases of the electric motor. The control device configured to control the electric power conversion device such that electric power supplied from an external power source through a neutral point of the electric motor is boosted and thereafter is supplied to the battery during charging of the battery. When an abnormality in one of the current sensors corresponding to the plurality of phases is detected during the charging, the control device configured to execute a ripple restraining control to continue the charging while controlling the switching elements in remaining normal phases of the plurality of phases such that a ripple current to be generated by operation of the switching elements in the normal phases does not exceed a ripple current threshold. The ripple current threshold corresponds to an allowable value of the ripple current to be generated by operation of the switching elements in the plurality of phases when there is no abnormality in any of the current sensors corresponding to the plurality of phases.

The plurality of phases may be three phases. In the ripple restraining control, the control device may be configured to operate the switching elements in two phases corresponding to the normal phases such that a phase difference between the switching elements in the two phases is 180°.

The allowable value corresponding to the ripple current threshold may be an allowable value of the ripple current to be generated when the switching elements in the three phases are operated such that a phase difference among the switching elements in the three phases is 1200 when there is no abnormality in any of the current sensors corresponding to the three phases.

When a temperature of a constituent component of the electric power conversion device exceeds a temperature threshold during execution of the ripple restraining control, the control device may be configured to restrict a magnitude of an electric current to flow in each normal phase such that the magnitude of the electric current to flow in each normal phase does not exceed a magnitude of an electric current to flow in each phase of the plurality of phases when there is no abnormality in any of the current sensors corresponding to the plurality of phases.

When the temperature of the constituent component of the electric power conversion device exceeds the temperature threshold during the execution of the ripple restraining control, the control device may be configured to restrict the magnitude of the electric current to flow in each normal phase by restricting an input current from the external power source.

With the vehicle power source device according to the present disclosure, it is possible to suitably continue the external charging while restraining the ripple current when an abnormality is detected in one of current sensors corresponding to a plurality of phases.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a diagram for describing a problem at the time of an external charging for which a neutral point charging scheme is used;

FIG. 2B is a diagram for describing the problem at the time of the external charging for which the neutral point charging scheme is used;

FIG. 4 is a flowchart showing a process relevant to a control during the external charging according to the embodiment.

DETAILED DESCRIPTION OF EMBODIMENTS

Figure 1:
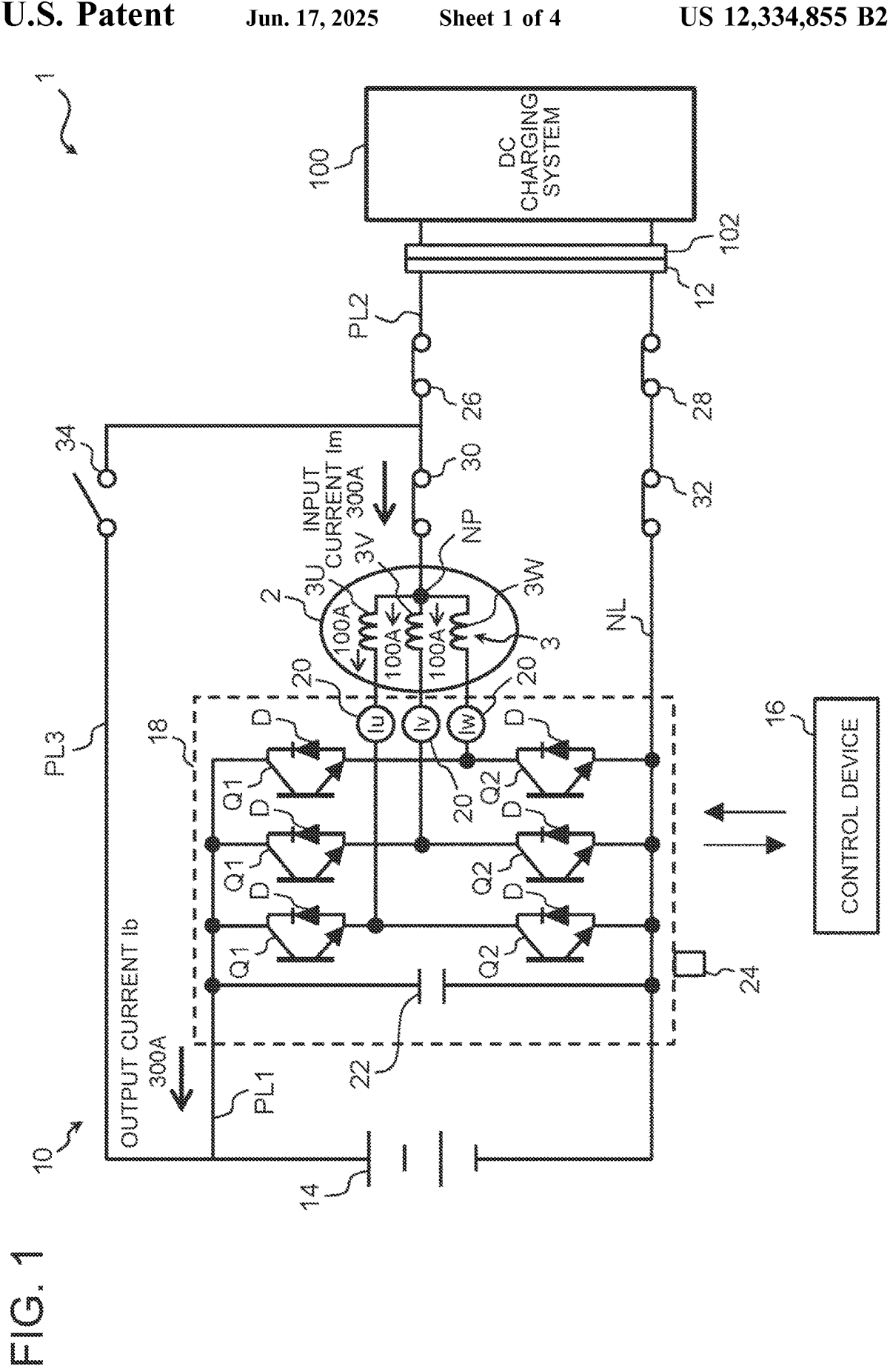
FIG. 1 is a diagram schematically showing an example of the configuration of a vehicle power source device according to an embodiment.

An embodiment of the present disclosure will be described with reference to the accompanying drawings.
1. Configuration of Vehicle Power Source Device FIG. 1 is a diagram schematically showing an example of the configuration of a vehicle power source device 10 according to the embodiment. The vehicle power source device 10 is applied to (equipped in) a vehicle 1. The vehicle 1 is a vehicle that can be charged (externally charged) by the electric power from an external power source. For example, the vehicle 1 is a battery electric vehicle (BEV). Alternatively, for example, the vehicle 1 may be a plug-in hybrid electric vehicle (PHEV).

The vehicle 1 includes an electric motor 2 for traveling that includes coils 3 in a plurality of phases. As an example, the electric motor 2 is a three-phase electric motor, and includes coils 3 for the respective phases, that is, includes a U-phase coil 3U, a V-phase coil 3V, and a W-phase coil 3W.

The vehicle power source device 10 includes a charging inlet 12, a battery 14, a control device 16, and an electric power conversion device 18.

As an example, the external power source is a direct-current (DC) charging system 100. When the external charging is performed, the charging inlet 12 is connected to a charging connector 102 of the DC charging system 100. The DC charging system 100 is a charging facility for supplying direct-current power to the vehicle 1, as exemplified by a charging station. For example, the battery 14 is a lithium-ion battery. The battery 14 is charged by the direct-current power supplied from the DC charging system 100 to the charging inlet 12. The vehicle 1 is driven by the electric motor 2 that is driven by the electric power supplied from the battery 14.

The control device 16 is an electronic control unit (ECU) that includes a processor and a storage device. The control device 16 executes various controls. The various controls include a control of the electric power conversion device 18 for the drive of the electric motor 2. Further, the various controls include controls relevant to the external charging, which include a control of the electric power conversion device 18. The various controls may be realized by software processing in which the processor executes previously stored programs, or may be realized by hardware processing with a dedicated electronic circuit. Further, the control device 16 is configured to be capable of communicating with the DC charging system 100 through a communication device (not illustrated).

The electric power conversion device 18 is also referred to as an electric power control unit (PCU) 18. The PCU 18 is connected in parallel with the battery 14. The PCU 18 includes a pair of a switching element Q1 and a switching element Q2 for each phase of the electric motor 2. For example, each of the switching elements Q1, Q2 is an insulated gate bipolar transistor (IGBT) with an antiparallel diode D. Alternatively, for example, each of the switching elements Q1, Q2 may be a metal-oxide semiconductor field-effect transistor (MOSFET) composed of silicon carbide (SiC). Each of the switching elements Q1, Q2 is controlled by a gate signal from the control device 16.

Further, the PCU 18 includes current sensors 20 for the respective phases of the electric motor 2. The three current sensors 20 detect electric currents in the respective phases, that is, an electric current Iu, an electric current Iv, and an electric current Iw that flow through the U-phase coil 3U, the V-phase coil 3V, and W-phase coil 3W, respectively. Furthermore, the PCU 18 includes a smoothing capacitor 22. The smoothing capacitor 22 is connected in parallel with the battery 14. Further, the PCU 18 includes a temperature sensor 24 that detects the temperature of constituent components. For example, the constituent components are the switching elements Q1, Q2.

In the U-phase, the switching elements Q1, Q2 are connected in series between an electric power line PL1 that is an electric line on the battery 14 side and a grounding line NL. Further, each of the switching element Q1 (upper arm) and the switching element Q2 (lower arm) is connected in series with one end of the U-phase coil 3U. Similarly, in the V-phase, the switching elements Q1, Q2 are connected in series between the electric power line PL1 and the grounding line NL, and each of the switching elements Q1, Q2 is connected in series with one end of the V-phase coil 3V. In the W-phase, the switching elements Q1, Q2 are connected in series between the electric power line PL1 and the grounding line NL, and each of the switching elements Q1, Q2 is connected in series with one end of the W-phase coil 3W.

As shown in FIG. 1, the U-phase coil 3U, V-phase coil 3V and W-phase coil 3W of the electric motor 2 are connected so as to form a star-shaped structure. That is, the electric motor 2 has a neutral point NP. The neutral point NP is connected to the charging inlet 12 through an electric power line PL2.

As an example, the vehicle power source device 10 includes five relays 26, 28, 30, 32, 34. The conduction and cutting-off of each of the relays 26 to 34 are controlled by the control device 16. Specifically, the relay 26 is disposed on the electric power line PL2. The relay 28 is disposed on the grounding line NL between the PCU 18 and the charging inlet 12. The relays 26, 28 are cut off when the charging inlet 12 is not connected to the charging connector 102, and are conducted when the charging inlet 12 is connected to the charging connector 102. The relay 30 is disposed on the electric power line PL2 between the relay 26 and the neutral point NP. The relay 32 is disposed on the grounding line NL between the relay 28 and the PCU 18. The relay 30 is conducted when the external charging is performed by a later-described neutral point charging scheme. For example, the relay 32 is conducted or cut off in conjunction with the relay 28. Further, the vehicle power source device 10 includes an electric power line PL3. One end of the electric power line PL3 is connected to the electric power line PL2 between the relay 26 and the relay 30. The other end of the electric power line PL3 is connected to the electric power line PL1 between a positive electrode terminal of the battery 14 and the smoothing capacitor 22. The relay 34 is disposed on the electric power line PL3. The conduction of the relay 34 will be described later.

In the vehicle power source device 10, in the case where the electric motor 2 is driven for vehicle traveling, the PCU 18, which is controlled by the control device 16, converts direct-current power from the battery 14 into three-phase alternating-current power, and supplies the alternating-current power to the electric motor 2. That is, in this case, the PCU 18 functions as an inverter.

Meanwhile, in the case where the external charging is performed, the combination of the coil 3 in each phase of the electric motor 2 having the neutral point NP and the PCU 18 can be used as a boost converter (boost chopper circuit).

Specifically, depending on the specification of the DC charging system 100 that is connected to the vehicle power source device 10, a supply voltage Vs from the DC charging system 100 is not always the same as a voltage Vb (for example, 800 V) of the battery 14. For example, the supply voltage Vs is 400 V or 800 V. For example, in the case where the supply voltage Vs is 400 V, the boost on the vehicle power source device 10 side is necessary for the external charging. In this case, during the external charging, the control device 16 controls the PCU 18 such that the electric power supplied from the external power source through the neutral point NP of the electric motor 2 is boosted and thereafter is supplied to the battery 14 (neutral point charging scheme).

For realizing the charging by the above neutral point charging scheme, as described above, the combination of the coil 3 in each phase of the electric motor 2 and the PCU 18 is used as the boost converter. More specifically, in each phase, the on-off of the switching elements Q1, Q2 is controlled such that electromagnetic energy is accumulated in the coil 3 that functions as a reactor and the accumulated electromagnetic energy is supplied to the electric power line PL1 (boost operation BO). By performing this boost operation BO, in the case where the voltage of the battery 14 is higher than the supply voltage Vs, it is possible to perform the external charging without requiring an additional boost converter.

On the other hand, in the case where the supply voltage Vs is 800 V, it is possible to perform the external charging, without requiring the boost on the vehicle power source device 10 side. In the case where the boost is not necessary in this way, in the vehicle power source device 10, at the time of the external charging, the relay 34 is conducted together with the relays 26, 28, 32, and the relay 30 is cut off. Thereby, it is possible to supply electric power from the DC charging system 100 to the battery 14, using the electric power line PL3.

2. Control During External Charging

The external charging for which the DC charging system 100 is used started in response to the detection of the connection of the charging connector 102 to the charging inlet 12. During the execution of the external charging, the control device 16 gives a current command value to the DC charging system 100 through the communication device, at intervals of a predetermined time. The DC charging system 100 outputs an electric current (an input current Im in FIG. 1) corresponding to the current command value received from the control device 16 (vehicle 1). More specifically, during the external charging, the control device 16 executes a feedback control for the electric currents Iu, Iv, Iw in the respective phases of the electric motor 2, such that the input current Im from the DC charging system 100 (external power source) and an output current Ib to the battery 14 are equal to each other. This feedback control is realized by controlling the operation of the switching elements Q1, Q2 in each phase such that an electric current of one-third of the input current Im flows in each phase. Each current value shown in FIG. 1 is an example. When the difference between the input current Im and the output current Ib during the external charging is large, the external charging is sometimes stopped in the DC charging system 100. Hence, the difference is reduced by the feedback control, and thereby the external charging can be appropriately continued.

When the state-of-charge (SOC) of the battery 14 reaches a predetermined value during the execution of the external charging or when a previously set charging time elapses, the control device 16 sends a charging stop command to the DC charging system 100. As a result, the external charging is ended.

In the case where an abnormality is detected in one of the current sensors 20 included for the respective phases of the electric motor 2 at the time of the external charging for which the above-described neutral point charging scheme is used, it is possible that the external charging is continued by controlling the switching elements Q1, Q2 of the PCU 18 that correspond to the remaining normal phases. For suitably continuing the external charging in this way, it is desired that the external charging is not stopped due to an excessive increase in a ripple current Ir. The ripple current Ir is generated in the output current (battery current) Ib due to the on-off operation of the switching elements Q1, Q2 in the respective phases for the above boost operation BO at the time of the external charging by the neutral point charging scheme. In more detail, the ripple current Ir is similarly generated also in the electric current that flows through the grounding line NL from the battery 14 to the DC charging system 100.

The above problem will be described in more detail with reference to FIG. 2A and FIG. 2B. First, FIG. 2A shows waveforms of carriers in the respective phases and the ripple current Ir (peak-to-peak value) generated in the output current (battery current) Ib in the case where there is no abnormality in any of the current sensors 20 in the respective phases. The carriers are used for the switching for the boost operation BO. As a premise, for reducing the ripple current Ir that is generated due to the execution of the boost operation BO, the control device 16 executes an interleaving operation in which the carriers in the three phases are shifted from each other by 120° as shown in FIG. 2A. A ripple current threshold THr in FIG. 2A will be described later.

Next, FIG. 2B corresponds to a case where there is an abnormality in one (for example, the current sensor 20 in the U-phase) of the three current sensors 20. FIG. 2B shows an example in which the external charging is continued while the interleaving operation in which the phase difference of 120° is used similarly to the example shown in FIG. 2A is applied to carriers in the normal phases (for example, the V-phase and the W-phase). In this example, as shown in FIG. 2B, the ripple current Ir cannot be appropriately reduced, and the ripple current Ir exceeds the ripple current threshold THr.

In view of the above-described problem, in the embodiment, when the abnormality is detected in one of the current sensors 20 corresponding to the three phases during the external charging, the control device 16 executes a "ripple restraining control" described below. By this ripple restraining control, the external charging is continued while the switching elements Q1, Q2 in the remaining normal phases (two phases) of the three phases are controlled such that the ripple current Ir to be generated by the operation of the switching elements Q1, Q2 in the normal phases does not exceed the ripple current threshold THr.

The ripple current threshold THr corresponds to an allowable value of the ripple current Ir to be generated by the operation of the switching elements Q1, Q2 in the three phases when there is no abnormality in any of the current sensors 20 corresponding the three phases. More specifically, the allowable value corresponds to an allowable value of the ripple current Ir to be generated by operating the switching elements Q1, Q2 while the phase difference among the three phases is 120° when there is no abnormality in any of the current sensors 20 corresponding to the three phases as shown in FIG. 2A. The ripple current threshold THr (allowable value) is set in advance, as the upper limit of the ripple current Ir that is allowed based on the design of the vehicle power source device 10 (in other words, as the upper limit of the ripple current Ir during the external charging).

Figure 3:
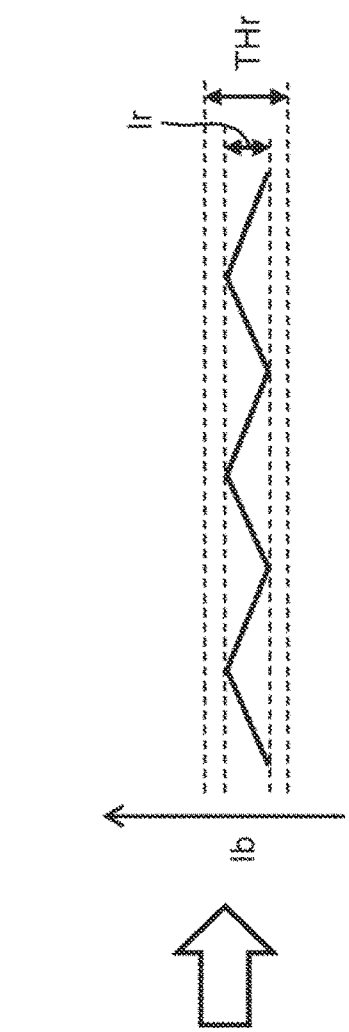
FIG. 3 is a diagram for specifically describing the operation of a ripple restraining control according to the embodiment.
Figure 3:
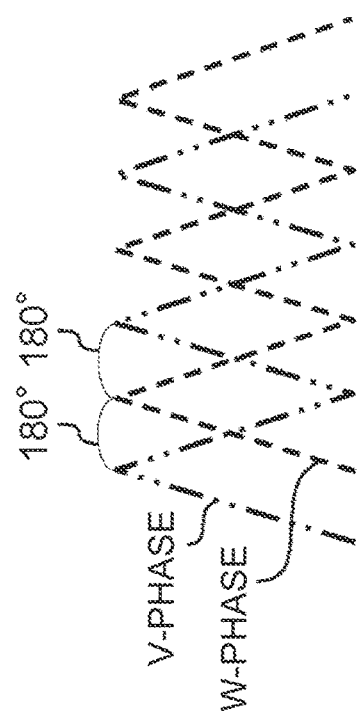

FIG. 3 is a diagram for specifically describing the operation of the ripple restraining control according to the embodiment. In the ripple restraining control, the control device 16 controls the switching elements Q1, Q2 in the two phases (for example, the V-phase and the W-phase) corresponding to the normal phases, such that the phase difference is 180°. In other words, as shown in FIG. 3, the interleaving operation is executed such that the carriers in the two phases corresponding to the normal phases are shifted from each other by 180°. As a result, the carriers in the two normal phases have opposite phases to each other. Thereby, even when there is an abnormality in one of the three current sensors 20, it is possible to continue the external charging while the ripple current Ir is restrained so as not to exceed the ripple current threshold THr. In addition, the above-described feedback control is executed such that the input current Im and the output current Ib are equal to each other, for the electric currents that flow in the two normal phases.

FIG. 4 is a flowchart showing a process relevant to the control during the external charging according to the embodiment. The process of the flowchart is started by the start of the external charging, and is executed by the processor of the control device 16, for example.

In step S100, the control device 16 determines whether an abnormality has been detected in one of the three current sensors 20. More specifically, the abnormality in the current sensor 20 is a failure by which the output of the current sensor 20 is fixed at a certain value, for example. As a technique for detecting the abnormality in the current sensor, various techniques can be used.

In the case where the abnormality has not been detected in any of the three current sensors 20 (step S100; No), the process of the flowchart ends. On the other hand, in the case where the abnormality has been detected in one of the three current sensors 20 (step S100; Yes), the process proceeds to step S102.

In step S102, the control device 16 stops the external charging once, and then executes a predetermined process for identifying a phase in which the abnormality has occurred in the current sensor 20. Thereafter, the process proceeds to step S104.

In step S104, the control device 16 restarts the external charging while executing the above-described ripple restraining control. Specifically, as described above, the control device 16 operates the switching elements Q1, Q2 in the two phases corresponding to the normal phases, such that the phase difference is 180°. That is, the carrier phase difference between the phases in the interleaving operation is changed from 120°, which is the phase difference when the three phases are assumed, to 180°, which is the phase difference for the two normal phases. Thereafter, the process proceeds to step S106.

In step S106, the control device 16 determines whether a temperature (component temperature) T of a constituent component of the PCU 18 exceeds a predetermined temperature threshold THt, using the temperature sensor 24. For example, the component temperature T is the temperature of the switching elements Q1, Q2. As a result, in the case where the component temperature T does not exceed the temperature threshold THt (step S106; No), the process proceeds to step S110. On the other hand, in the case where the component temperature T exceeds the temperature threshold THt (step S106; Yes), the process proceeds to step S108.

In step S108, the control device 16 restricts the input current (charging current) Im from the DC charging system 100. Specifically, by the restriction of the input current Im, the control device 16 restricts the magnitude of the electric current to flow in each phase of the normal phases, such that the magnitude of the electric current to flow in each phase of the normal phases does not exceed the magnitude of the electric current (each-phase current) to flow in each phase of the three phases when there is no abnormality in any of the current sensors 20 corresponding to the three phases. More specifically, the control device 16 restricts the input current Im, by restricting the current command value to the DC charging system 100 to a low value. Thereafter, the process proceeds to step S110.

If the input current Im is the same regardless of the existence of the abnormality in the current sensors 20, the following problem can be produced when the switching elements Q1, Q2 in the normal phases (two phases) are operated at the phase difference of 180° by the process in step S104 (see FIG. 3). At the time of the operation at the phase difference of 180°, the each-phase current (the electric current in one phase) is larger than at the time of the operation at the phase difference of 120° when there is no abnormality in any of the current sensors 20 corresponding to the three phases (see FIG. 2A). When the component temperature T is sufficiently low, the input current Im may be the same as that at normal time, even if the each-phase current is larger. However, when the component temperature T is not sufficiently low, it is desirable to restrain the rise in the component temperature T due to the execution of the process of step S104. In this respect, by the processes of steps S106 and S108, it is possible to restrain the ripple current Ir while keeping the opportunity to restrict the input current Im to the minimum necessary and restraining an excessive rise in the component temperature T due to the execution of the process of step S104.

In step S110, the control device 16 determines whether the external charging has been completed. As a result, in the case where the external charging has not been completed (step S110; No), the process returns to step S106. On the other hand, in the case where the external charging has been completed (step S110; Yes), the process of the flowchart ends.

In the above embodiment, the example in which the vehicle power source device 10 is applied to the vehicle 1 including the electric motor 2 for traveling that includes the coils 3 in the three phases has been described. However, the "vehicle power source device" according to the present disclosure may be applied to vehicles including electric motors for traveling that include coils in four or more phases.

What is claimed is:

1. A vehicle power source device that is applied to a vehicle including an electric motor for traveling, the electric motor including coils in a plurality of phases,
the vehicle power source device comprising:
a battery configured to supply electric power to the electric motor;
an electric power conversion device that is connected in parallel with the battery and that includes switching elements and current sensors for respective phases of the electric motor; and
a control device configured to control the electric power conversion device such that electric power supplied from an external power source through a neutral point of the electric motor is boosted and thereafter is supplied to the battery during charging of the battery, wherein when an abnormality in one of the current sensors corresponding to the plurality of phases is detected during the charging, the control device configured to execute a ripple restraining control to continue the charging, the ripple restraining control including controlling the switching elements in remaining normal phases of the plurality of phases such that a ripple current to be generated by operation of the switching elements in the normal phases does not exceed a ripple current threshold, and the ripple current threshold corresponds to an allowable value of the ripple current to be generated by operation of the switching elements in the plurality of phases when there is no abnormality in any of the current sensors corresponding to the plurality of phases.

2. The vehicle power source device according to claim 1, wherein:
the plurality of phases is three phases; and
in the ripple restraining control, the control device configured to operate the switching elements in two phases corresponding to the normal phases such that a phase difference between the switching elements in the two phases is 180°.

3. The vehicle power source device according to claim 2, wherein the allowable value corresponding to the ripple current threshold is an allowable value of the ripple current to be generated when the switching elements in the three phases are operated such that a phase difference among the switching elements in the three phases is 120° when there is no abnormality in any of the current sensors corresponding to the three phases.

4. The vehicle power source device according to claim 1, wherein when a temperature of a constituent component of the electric power conversion device exceeds a temperature threshold during execution of the ripple restraining control, the control device configured to restrict a magnitude of an electric current to flow in each normal phase, such that the magnitude of the electric current to flow in each normal phase does not exceed a magnitude of an electric current to flow in each phase of the plurality of phases when there is no abnormality in any of the current sensors corresponding to the plurality of phases.

5. The vehicle power source device according to claim 4, wherein when the temperature of the constituent component of the electric power conversion device exceeds the temperature threshold during the execution of the ripple restraining control, the control device configured to restrict the magnitude of the electric current to flow in each normal phase by restricting an input current from the external power source.

* * * * *